W. H. DAMON.
SUN AND RAIN SHIELD FOR AUTOMOBILES.
APPLICATION FILED DEC. 16, 1918.

1,332,162.

Patented Feb. 24, 1920.

INVENTOR.
WILLIAM H. DAMON
BY
Hazard & Miller
ATTORNEYS.

UNITED STATES PATENT OFFICE.

WILLIAM H. DAMON, OF LOS ANGELES, CALIFORNIA.

SUN AND RAIN SHIELD FOR AUTOMOBILES.

1,332,162.   Specification of Letters Patent.   Patented Feb. 24, 1920.

Application filed December 16, 1918. Serial No. 266,995.

*To all whom it may concern:*

Be it known that I, WILLIAM HUNTINGTON DAMON, a citizen of the United States, residing at Los Angeles, in the county of Los Angeles and State of California, have invented new and useful Improvements in Sun and Rain Shields for Automobiles, of which the following is a specification.

My object is to make a sun and rain shield for automobiles, and my invention consists of the novel features herein shown, described and claimed.

Figure 1:
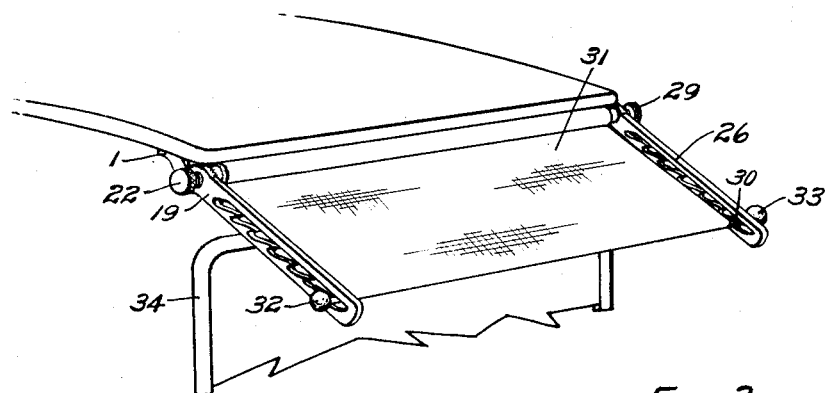
Figure 1 is a perspective of a sun and rain shield embodying the principles of my invention in position for use upon an automobile top, the top and wind shield being broken away to economize space.
Figure 2:
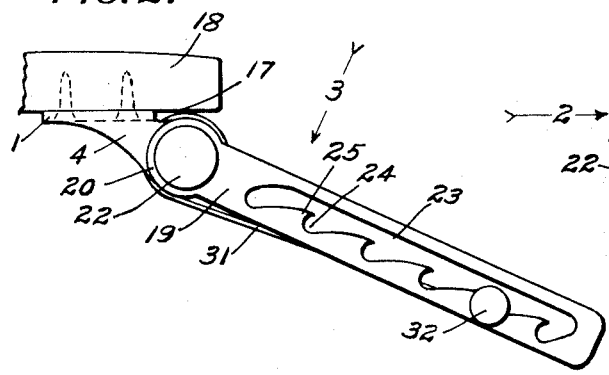
Fig. 2 is an enlarged side elevation of the sun and rain shield, the top being broken away and the view being taken looking in the direction indicated by the arrow 2 in Fig. 3.
Figure 3:
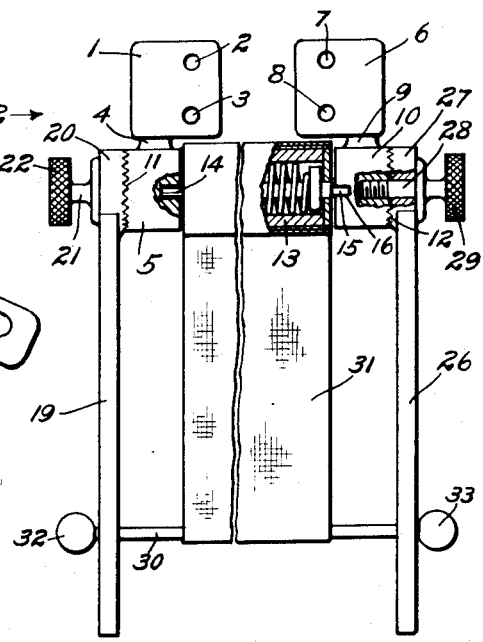
Fig. 3 is a fragmentary top plan view of the sun and rain shield removed from the automobile top, the view being taken looking in the direction indicated by the arrow 3 in Fig. 2.

The attaching plate 1 is flat upon its upper face and has screw holes 2 and 3. A shank 4 extends downwardly and forwardly from the lower face of the plate 1 near its outer edge, and a bearing 5 extends forwardly from the shank 4. The attaching plate 6 is similar to the plate 1, except that the plates are made right and left. Screw holes 7 and 8 are formed through the plate 6, the shank 9 extends downwardly and forwardly from the lower face of the plate 6 and near its outer edge, and the bearing 10 extends forwardly from the shank 9. The bearing 5 has a corrugated outer face 11, and the bearing 10 has a corrugated outer face 12. The spring curtain roller 13 has a round pintle 14 journaled in the bearing 5, and a square pintle 15 fitting non-rotatably and removably in the slot 16 in the bearing 10. The attaching plates 1 and 2 are placed upwardly against the lower face 17 of the automobile top 18 and secured in place by screws inserted through the holes 2, 3, 7 and 8 into the frame of the top. Preferably the bearing plates 1 and 6 are located at the extreme outer edges of the front corners of the top and far enough back from the forward edge of the top, so that the curtain roller 13 is covered by the top.

The supporting arm 19 has a bearing 20 provided with a corrugated face fitting the corrugated face 11, and a clamping screw 21 is inserted through the bearing 20 and screw seated in the bearing 5 to clamp the bearing 20 in its adjusted position against the bearing 5, so as to hold the arm 19 at a desired angle. The clamping screw 21 has a knurled head 22, but it is obvious that the screw may have a wing head or a wrench head or any desired form of head. The arm 19 has a longitudinally extending slot 23 with recesses 24 extending from one side of the slot to form the hooks 25. In a like manner, the supporting arm 26 has a bearing 27 provided with a corrugated face to fit the corrugated face 12, and a clamping screw 28 inserted through the bearing 27 and screw seated in the bearing 10 to clamp the bearing 27 against the bearing 10 and hold the arm 26 in its adjusted position, there being a knurled head 29 upon the screw 28, and the arm 26 being provided with a slot and recess to form hooks, in the same manner as the arm 19.

A rod 30 is fixed to the lower edge of the curtain 31, the other edge of the curtain being attached to the roller 13, so that the curtain will wind upon the roller, and the rod 30 extends through the slot 23 in the arms 19 and 26, and knobs 32 and 33 are fixed upon the outer ends of the rod 30 outside of the arms.

When it is desired to protect the occupants of the front seat of the automobile from sun or rain the clamping screws 21 and 28 are operated to adjust the arms 19 and 26 and to hold the arms rigidly in their adjusted positions; then the rod 30 is manipulated to draw the curtain from the roller and the rod engages the desired ones of the hooks 25 to hold the curtain extended.

If the attaching plates 1 and 6 are at the extreme outer sides of the top 18 and the roller 13 is behind the front edge of the top, the curtain 31 will wind upon the roller and rest under the top 18, and the arms 19 and 26 will swing past the sides of the wind shield 34 or into vertical alinement with the wind shield, and if the rod 30 is removed from the arms 19 and 26, the arms will swing around and past the side edges of the top 18.

If the curtain roller 13 is too short for the width of the top 18, the attaching plates 1 and 6 may be moved inwardly from the side edges of the top.

I have shown the curtain roller attached to the top of an automobile. It is obvious, however, that it is immaterial where the same is attached, for many automobiles it may be more convenient to attach the same to the upper part of the wind shield frame.

Various changes may be made without departing from the spirit of my invention as claimed.

I claim:

1. A sun and rain shield for automobiles comprising, attaching plates adapted to be secured to an automobile top, bearings extending from the attaching plates, a spring curtain roller mounted in the bearings, supporting arms having bearings adapted to be clamped to the first bearings and having longitudinal slots and recesses extending from the slots to form hooks, a curtain upon the curtain roller, and a curtain rod secured to the outer edge of the curtain and extending through the slots and engaging the hooks; so that the arms may be adjusted up and down, and so that the curtain rod may be adjusted to or from the curtain roller.

2. A sun and rain shield for automobiles comprising attaching means adapted to be secured above the glass of the windshield of an automobile, bearings extending from the attaching means, a spring curtain roller mounted in the bearings, supporting arms having bearings adapted to be clamped to the first bearings and having longitudinal slots and recesses extending from the slots to form hooks, a curtain upon the curtain roller, and a curtain rod secured to the outer edge of the curtain and extending through the slots and engaging the hooks; so that the arms may be adjusted up and down, and so that the curtain rod may be adjusted to or from the curtain roller.

In testimony whereof I have signed my name to this specification.

WM. H. DAMON.